United States Patent [19]

Ishihara et al.

[11] Patent Number: 5,209,989
[45] Date of Patent: May 11, 1993

[54] SOLID OXIDE FUEL CELL

[75] Inventors: Takeshi Ishihara; Hidenobu Misawa, both of Toyoake; Satoru Yamada, Nagoya, all of Japan

[73] Assignee: NGK Insulators, Ltd., Japan

[21] Appl. No.: 653,283

[22] Filed: Feb. 11, 1991

[30] Foreign Application Priority Data

Feb. 15, 1990 [JP] Japan .................................. 2-32380
Feb. 20, 1990 [JP] Japan .................................. 2-37151

[51] Int. Cl.$^5$ .............................................. H01M 8/10
[52] U.S. Cl. .................................... 429/30; 429/38; 429/39
[58] Field of Search ............................ 429/30, 38, 39

[56] References Cited

U.S. PATENT DOCUMENTS

| | | | |
|---|---|---|---|
| 3,147,149 | 9/1964 | Postal | 136/86 |
| 3,311,504 | 3/1967 | Johnson | 136/86 |
| 3,377,203 | 4/1968 | Mobius et al. | 136/86 |
| 3,861,959 | 1/1975 | Cadiou | 429/30 |
| 4,331,742 | 5/1982 | Richter | 429/33 |
| 4,520,082 | 5/1985 | Makiel | 429/26 |
| 4,640,875 | 2/1987 | Makiel | 429/30 |
| 4,648,945 | 3/1987 | Isenberg | 204/15 |
| 4,664,986 | 5/1987 | Draper et al. | 429/31 |
| 4,666,798 | 5/1987 | Herceg | 429/30 |
| 4,910,100 | 3/1990 | Nakanishi et al. | 429/32 |

FOREIGN PATENT DOCUMENTS

| | | |
|---|---|---|
| 0055011 | 6/1982 | European Pat. Off. . |
| 0181680 | 5/1986 | European Pat. Off. . |
| 0242200 | 10/1987 | European Pat. Off. . |
| 0242201 | 10/1987 | European Pat. Off. . |
| 0286360 | 10/1988 | European Pat. Off. . |

Primary Examiner—Mark L. Bell
Assistant Examiner—Willie J. Thompson
Attorney, Agent, or Firm—Parkhurst, Wendel & Rossi

[57] ABSTRACT

A solid oxide fuel cell including tube-shaped solid oxide fuel cell elements. One gas selected from an oxidizing gas and a fuel gas flows in an internal space of the element, and the other gas flows in an external space of the element. A means for converting an oxidizing gas-flow and/or a fuel gas-flow into turbulent flow is provided in the internal space and/or the external space. The converting means is preferably an elongated body such as a tube-shaped body, a solid pillar-shaped body, a hollow-cylindrical body, a solid-cylindrical body and a rod with plates, extending in the longitudinal direction of the element.

13 Claims, 10 Drawing Sheets

FIG_1
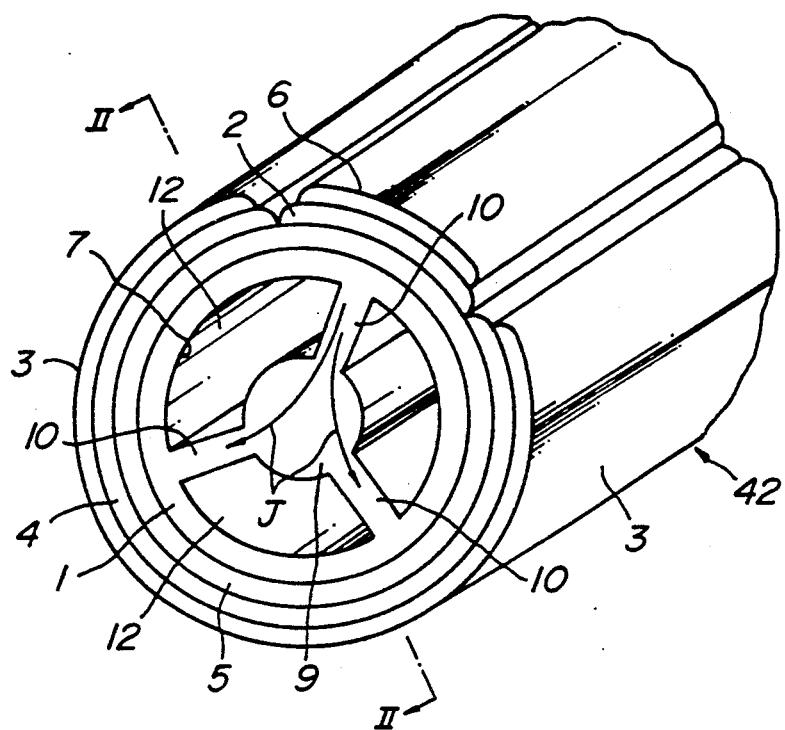
FIG_2
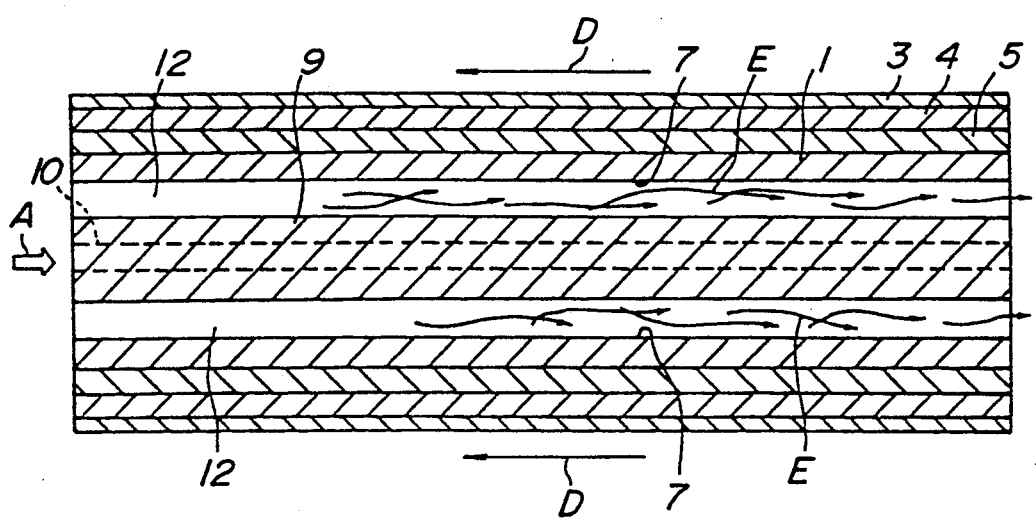

FIG._5
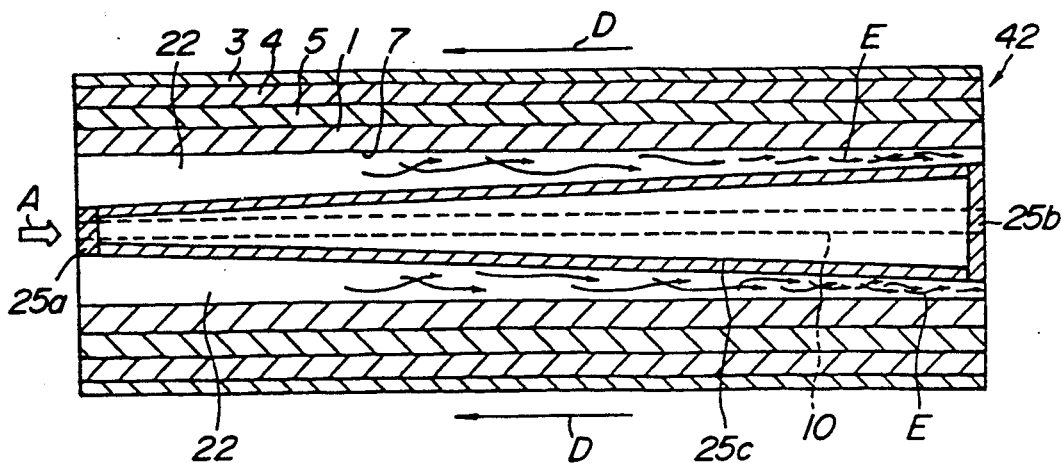
FIG._6
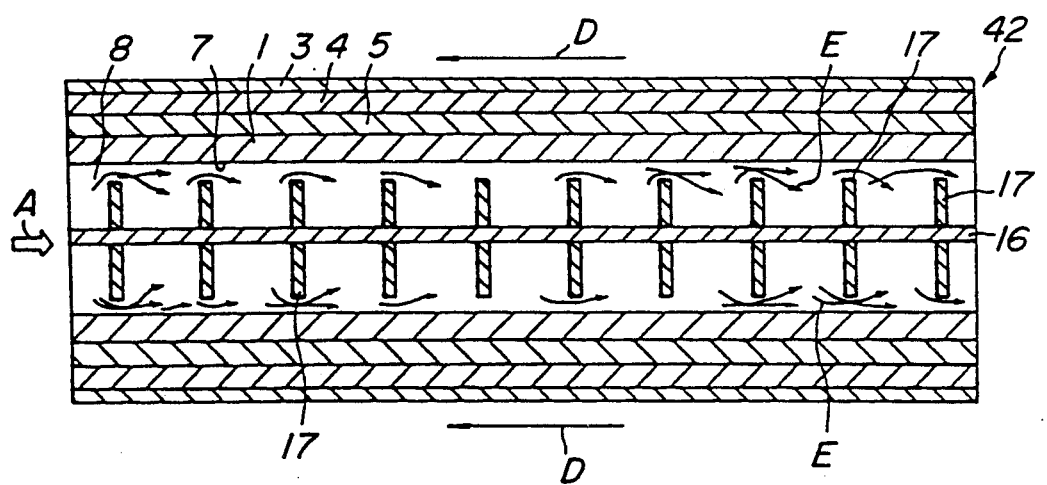

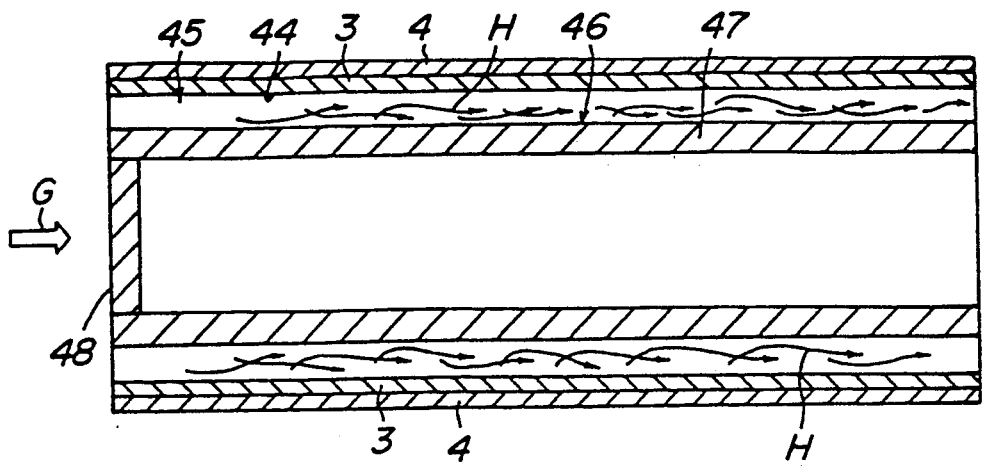
FIG_9
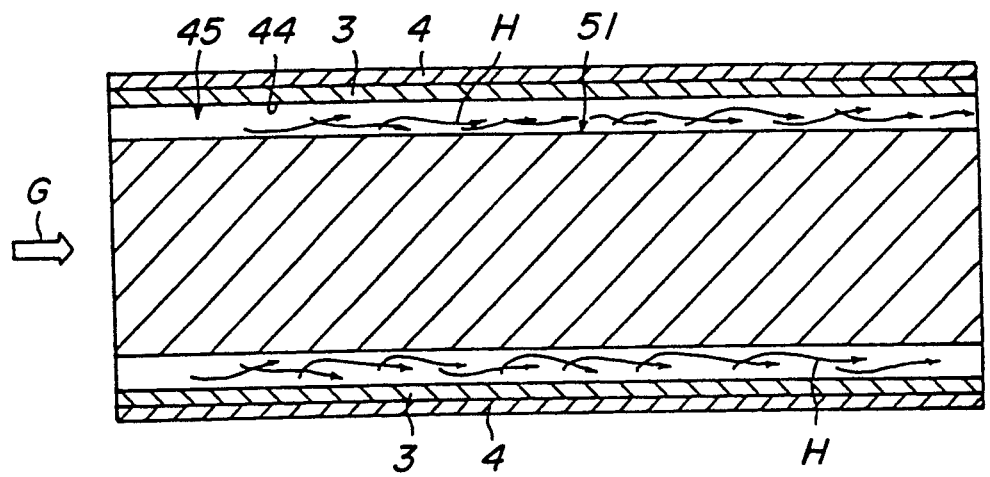
FIG_10

FIG_11
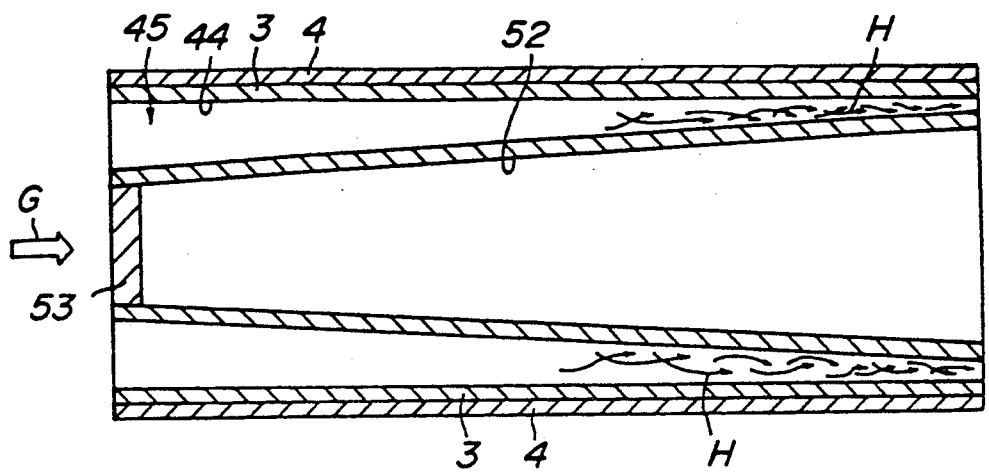
FIG_12
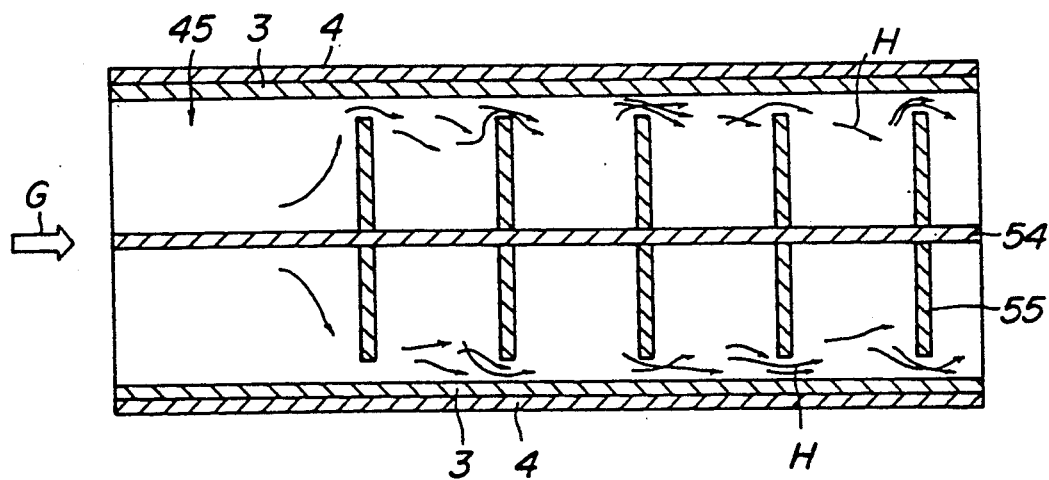

FIG_13
*PRIOR ART*
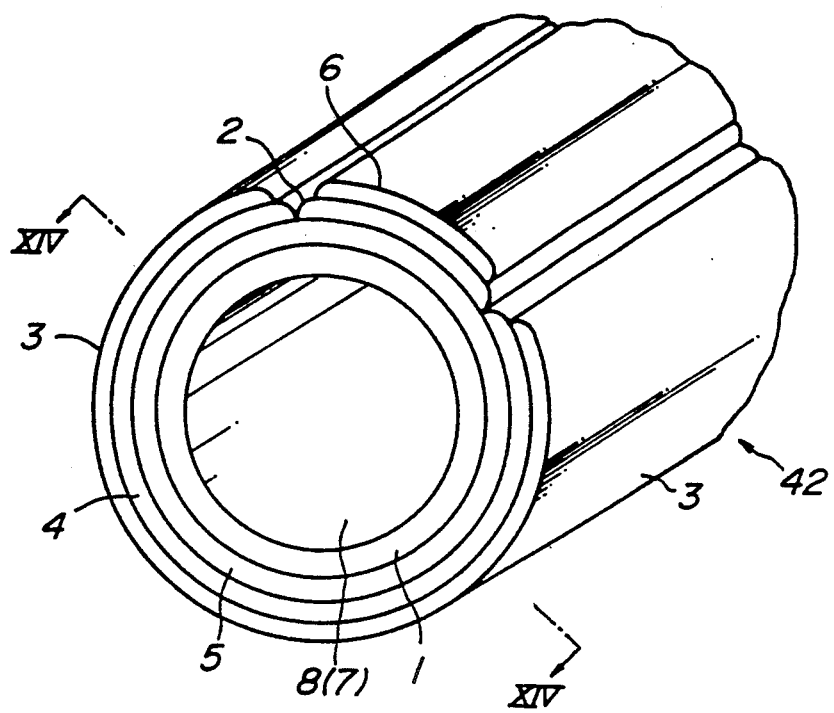
FIG_14
*PRIOR ART*
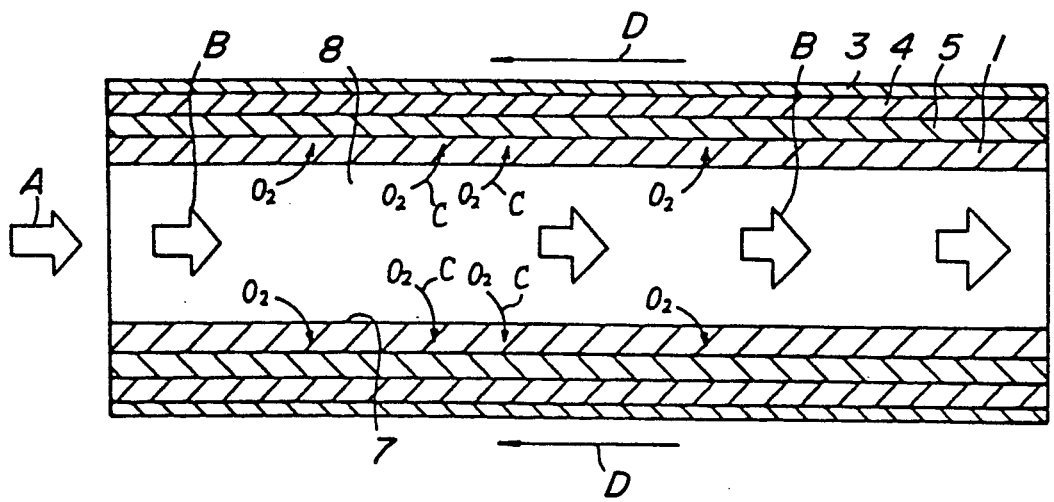

FIG_15
PRIOR ART
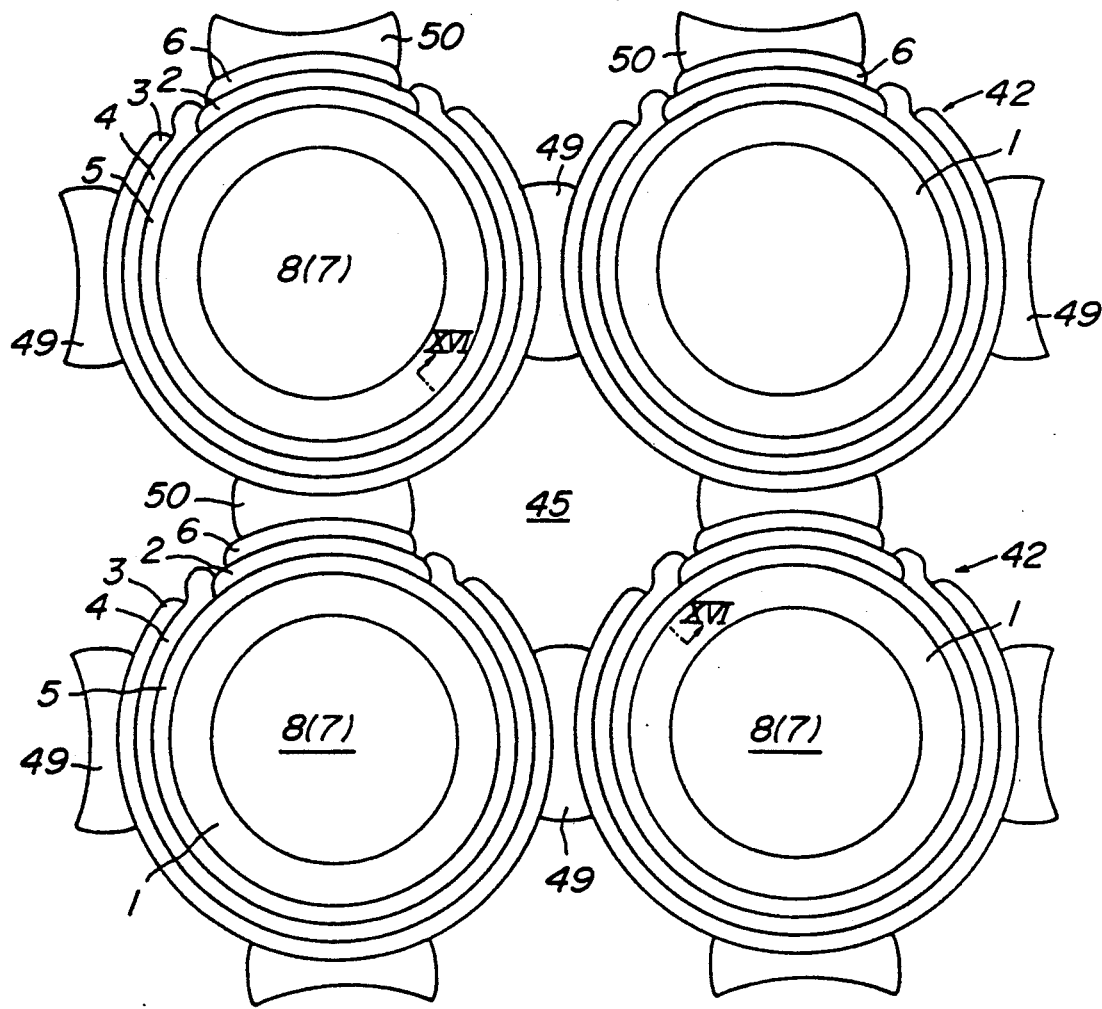

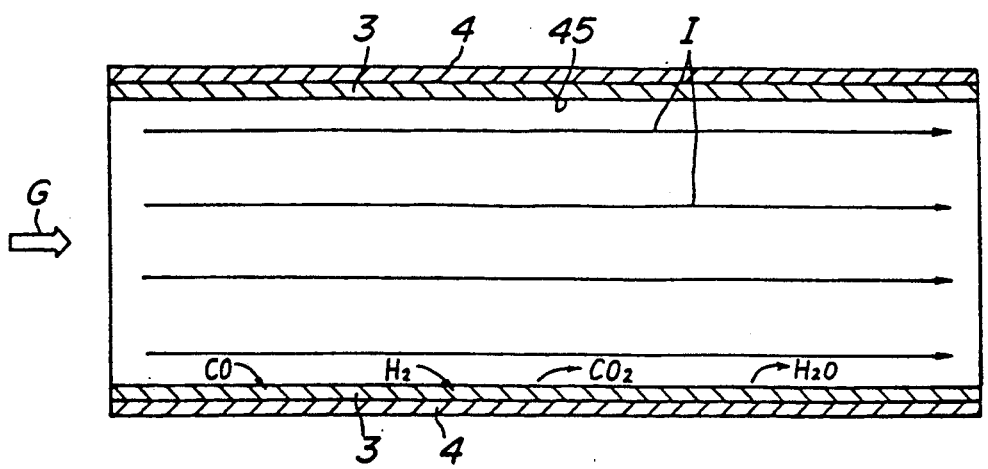
FIG_16
PRIOR ART

SOLID OXIDE FUEL CELL

BACKGROUND OF THE INVENTION

1. Field of the Invention

The present invention relates to solid oxide fuel cells.

2. Related Art Statement

Recently, fuel cells have been recognized as useful for power generating equipment. The fuel cell is an a device capable of directly converting chemical energy possessed by fuel to electric energy. Since the fuel cell is free from limitation of Carnot's cycle, the cell is an extremely promising technique in that the fuel cell essentially has a high energy conversion efficiency, a variety of fuels (naphtha, natural gas, methanol, coal reformed gas, heavy oil, etc.) may be used, the cell provokes less public nuisance, and its power generating efficiency is not influenced by the scale of the equipment.

Particularly, since the solid oxide fuel cell (hereinafter referred as SOFC) operates at high temperatures of 1,000° C. or more, activity of electrodes is extremely high. Thus, catalyst of a noble metal such as expensive platinum is not necessary. In addition, since the SOFC has low polarization and relatively high output voltage, its energy conversion efficiency is conspicuously higher than that in the other fuel cells Furthermore, since their constituent materials are all solid, the SOFC is stable and has a long use life.

FIG. 13 is a partial perspective view of an example of the conventional hollow-cylindrical SOFC element (an electric cell), and FIG. 14 is a sectional view taken along a line (XIV—XIV) of FIG. 13.

In FIG. 13, an air electrode 5 is formed on an outer periphery of a hollow-cylindrical porous ceramic tube 1, and a solid electrolyte 4 and a fuel electrode 3 are arranged around the outer periphery of the air electrode 5 in this order. Furthermore, an interconnector 2 is arranged on the air electrode 5 at an upper side region of the SOFC shown in FIG. 13 and a connecting terminal 6 is attached thereto. In series connection of the hollow-cylindrical SOFC elements, the air electrode 5 is connected to the fuel electrode 3 of an adjoining SOFC element through the interconnector 2 and the connecting terminal 6. In parallel connection of the hollow-cylindrical SOFC elements, the fuel electrodes 3 of the adjoining SOFC elements are connected through Ni felt or the like.

When operating the hollow-cylindrical SOFC, as shown in FIG. 14, fuel gas such as hydrogen, carbon monoxide etc., is fed around the outer surface of the fuel electrode 3 as shown by arrows D, and an oxidizing gas is fed into an oxidizing gas-flow route 8, which is an internal space 7 of the cylindrical element, as shown by arrows A and B.

However, in the internal space 7, the oxidizing gas flows in regular flow lines and in layers Therefore, in the inner peripheral portion of the porous support tube 1 facing the internal space 7, oxygen contained in the oxidizing gas is consumed successively from one end toward the other end as shown by arrows C. Consequently, as the gas-flow approaches the right end of the SOFC element shown in FIG. 14, the concentration of oxygen in the gas decreases to inactivate the ion reaction at the electrode and to lower the elevation of the temperature. Furthermore, the lowering of the temperature further inactivates the reaction. As a result, oxygen contained in the oxidizing gas flowing through the flow route 8 is not fully consumed or utilized thus lowering the power generating efficiency of the cell. Moreover, the temperature gradient between the areas of higher reactivity and lower reactivity causes large thermal strain and stress in the longitudinal direction of the SOFC element.

In addition, since the oxidizing gas flows in layers as described above, the oxidizing gas flowing in the central portion of the internal space hardly contributes to the power generation. Moreover, the oxidizing gas flows more slowly in the outer peripheral portion of the internal space 7 on the one hand and more rapidly in the central portion on the other hand, so that a larger quantity of oxygen flows through the internal space 7 before contributing to the power generation.

Similar problems occur in the case of the hollow-cylindrical SOFC in which a fuel electrode is arranged inside the solid electrolyte and the fuel gas is fed into the internal space for the power generation. In such a case, a large amount of the fuel gas flows through the internal space before contributing to the power generation.

Besides, when the hollow-cylindrical SOFC elements are electrically connected in series and in parallel, similar problems occur in the external spaces of the hollow-cylindrical elements.

FIG. 15 is a front view showing a part of a SOFC generator comprising an arrangement of such hollow-cylindrical SOFC elements, and FIG. 16 is a cross sectional view taken along a line XIV—XIV of FIG. 15.

The air electrode 5 is formed on the outer periphery of the hollow-cylindrical porous ceramic tube 1, and the solid electrolyte 4 and the fuel electrode 3 are arranged around the outer periphery of the air electrode 5 in this order. Furthermore, the interconnector 2 is arranged on the air electrode 5 at an upper side region of the SOFC element shown in FIG. 15 and the connecting terminal 6 is attached thereto. Then, the air electrodes 5 of the thus composed hollow-cylindrical SOFC elements 42 are electrically connected to the fuel electrodes 3 of the adjoining SOFC elements 42 in the upper direction shown in FIG. 15 through the interconnectors 2, the connecting terminals 6 and metal felts 50. A plurality of the hollow-cylindrical SOFC elements 42 are thus electrically connected in series in a vertical direction shown in FIG. 15. Besides, the fuel electrodes 3 of the hollow-cylindrical SOFC elements 42 adjoining each other in a horizontal direction in FIG. 15 are electrically connected to each other through metal felts 49. A plurality of the hollow-cylindrical SOFC elements 4 are electrically connected in parallel in the horizontal direction shown in FIG. 15.

When operating the cylindrical SOFC, the oxidizing gas containing oxygen is fed into the internal spaces 7 of the elements 42. Furthermore, fuel gas such as hydrogen, carbon monoxide, etc. is fed into an external space 45 formed between the outer surfaces of the arranged hollow-cylindrical SOFC elements 42 and around the outer surfaces of the fuel electrodes 3 as shown by arrows G and I in FIG. 16.

However, in the external space 45, the fuel gas flows in regular flow lines and in layers as shown by the arrows I. Therefore, carbon monoxide or hydrogen is consumed successively at the fuel electrodes 3 near the outer peripheral portion of the external space 45 from one end toward the other end. Consequently, as the gas-flow approaches the right end of the SOFC element shown in FIG. 16, the concentration of fuel ingredient in the gas decreases to inactivate the electrochemical reactions and to lower the elevation of the temperature. Furthermore, the lowering of the temperature further inactivates the reaction at the electrodes Moreover, since a large amount of $CO_2$, steam, etc. is contained in the fuel gas having its concentration reduced, these ingredients attach to the surface of the fuel electrodes to obstruct the reaction. Thus, the reaction becomes more inactive and the temperature is lowered further. This tendency becomes more considerable as each cylindrical SOFC element is lengthened. As a result, the fuel ingredient contained in the fuel gas is not fully utilized to the reaction at the electrodes contributing to the power generation, and the power generating efficiency of each cell is lowered. Moreover, the temperature gradient between the areas of higher reactivity and lower reactivity causes large thermal strain and stress in the longitudinal direction of the SOFC element. In addition, since the fuel gas flows in layers as described above, the fuel gas flowing in the central portion of the external space 45 hardly contributes to the power generation. Moreover, the fuel gas flows more slowly in the outer peripheral portion of the external space 45 on one hand and more rapidly in the central portion on the other hand, so that a larger quantity of the fuel ingredient flows through the external space before contributing to the power generation to further lower the power generating efficiency.

SUMMARY OF THE INVENTION

It is an object of the invention to provide a tube-shaped solid oxide fuel cell which can utilize the oxidizing gas-flow or the fuel gas-flow more efficiently for power generation and reduce the loss of the oxidizing gas or the fuel gas.

It is an another object of the invention to provide a tube-shaped solid oxide fuel cell which can utilize the oxidizing gas or the fuel gas flowing especially in the internal space more efficiently for power generation and can reduce the loss of the oxidizing gas or the fuel gas to obtain high power generating efficiency.

It is a further object of the invention to provide a solid oxide fuel cell which can reduce the loss of the gas flowing through the external space formed between a plurality of tube-shaped solid oxide fuel cell elements before contributing to power generation and can enhance power generating efficiency.

According to the invention, there is the provision of a solid oxide fuel cell in which one gas selected from oxidizing gas and fuel gas flows in an internal space of a tube-shaped solid oxide fuel cell element and the other gas flows in an external space of the element, said cell being provided with a means for converting an oxidizing gas-flow and/or a fuel gas-flow into turbulent flow.

In a first preferred embodiment of the invention, the means for converting the oxidizing gas-flow or the fuel gas-flow in the internal space into turbulent flow is arranged in the internal space.

In a second preferred embodiment of the invention, a plurality of the elements are arranged, and electrodes of the adjoining elements are electrically connected to each other, and the external space is formed between a plurality of the elements, and the means for converting the oxidizing gas-flow or the fuel gas-flow in the external space into the turbulent flow is arranged in the external space.

According to the solid oxide fuel cells of the invention, since the cell is provided with means for converting the oxidizing gas-flow and/or fuel gas-flow into turbulent flow, depleted-flow in which an oxygen or a fuel concentration has already been decreased is mixed into fresh-flow having relatively high oxygen or fuel concentration in the oxidizing gas-flow or the fuel gas-flow as a whole. Therefore, it is possible to prevent the depleted oxidizing gas or the depleted fuel gas, in which the oxygen or the fuel concentration has already been decreased, from continuing to flow in layers around the surface of the elements. As a result, it is possible to prevent the lowering of power generating efficiency due to the decrease of the oxygen or the fuel concentration, and to reduce the thermal stress and strain due to non-uniformity of the reactivity at the electrodes. Moreover, since it is possible to prevent the flow of the fresh gas through the cell without being utilized for power generation, the fresh gas can be effectively utilized to improve power generating efficiency considerably.

According to the first preferred embodiment of the invention, since the means for converting the oxidizing gas-flow or the fuel gas-flow into turbulent flow is arranged in the internal space, depleted-flow in which the oxygen or the fuel concentration has already been decreased is mixed with fresh-flow having relatively high oxygen or fuel concentration in the oxidizing gas-flow or the fuel gas-flow as a whole. Therefore, it is possible to prevent the depleted oxidizing gas or the depleted fuel gas, in which the oxygen or the fuel concentration has already decreased, from continuing to flow in layers in the internal space and around the inner surface of the elements. As a result, it is possible to prevent the lowering of power generating efficiency due to the decrease of the oxygen or the fuel concentration, and to reduce the thermal stress and strain due to non-uniformity of the reactivity at the electrodes. Moreover, since it is possible to prevent the flowing of the fresh gas through the internal space without being utilized for power generation, the fresh gas can be effectively utilized to improve power generating efficiency considerably.

According to the second preferred embodiment of the invention, since the means for converting the fuel gas-flow or the oxidizing gas-flow, which flows through the external space formed between a plurality of the elements, into turbulent flow is arranged in the external space, the depleted-flow in which the oxygen or the fuel concentration has already been decreased is mixed with fresh-flow having relatively high oxygen or fuel concentration in the oxidizing gas flow or the fuel gas flow as a whole. Therefore, it is possible to prevent the depleted oxidizing gas or the depleted fuel gas, in which the oxygen or the fuel concentration has already been decreased, from continuing to flow in layers around the outer surface of each element. As a result, it is possible to prevent the lowering of power generating efficiency due to the decrease of the oxygen or the fuel concentration, and to reduce the thermal stress and strain due to non-uniformity of the reactivity at the electrodes. Moreover, since it is possible to prevent the flowing of the fresh gas through the external space without being utilized for the power generation, the fresh gas can be effectively utilized to improve power generating efficiency considerably.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims attached hereto.

BRIEF DESCRIPTION OF THE DRAWINGS

For a better understanding of the invention, reference is made to the attached drawings, wherein:

FIG. 1 is a partial perspective view of a hollow-cylindrical SOFC embodying the first preferred embodiment of the invention;

FIG. 2 is a sectional view taken along a line II—II of FIG. 1;

FIGS. 3 to 6 are sectional views of the other examples of the hollow cylindrical SOFC, respectively (taken in the same method as FIG. 2);

FIG. 9 is a sectional view taken along a line IX—IX of FIG. 8;

FIGS. 10 to 12 are cross sectional views of the other examples of the hollow-cylindrical SOFC, respectively (taken in the same method as FIG. 9);

FIG. 13 is a partial perspective view of a conventional SOFC;

FIG. 14 is a sectional view taken along a line XIV—XIV of FIG. 13;

FIG. 15 is a partial front view of another conventional SOFC; and

FIG. 16 is a cross sectional view taken along a line XVI—XVI of FIG. 15.

DETAILED DESCRIPTION OF THE INVENTION

Figure 3:
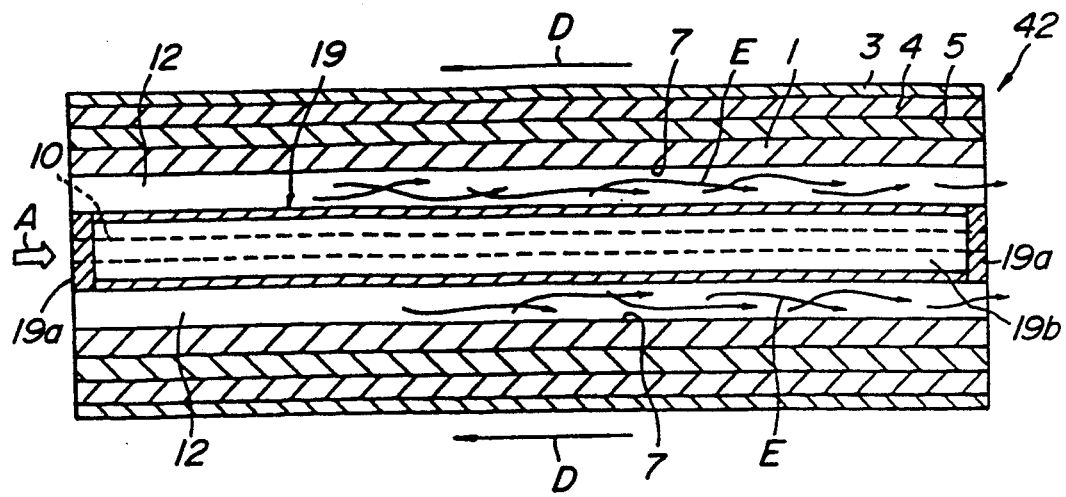

The following examples are given in illustration of the invention and are not intended as limitations thereof.

FIG. 1 is a partial perspective view of a hollow-cylindrical SOFC embodying the first preferred embodiment of the invention, and FIG. 2 is a sectional view taken along a line II—II of FIG. 1.

In the hollow-cylindrical SOFC, a solid-cylindrical body 9 is placed in a central portion of an internal space 7 of a hollow-cylindrical SOFC element so as to extend from one opening of the element to the other opening thereof. Three flat-plate shaped ribs 10 extend radially on the surface of the body 9 and connect to the surface of a porous ceramics support tube 1. The ribs 10 also extend from one opening of the element to the other opening thereof. The body 9 is fixed with three ribs 10 in the internal space 7. As a result, three oxidizing gas-flow routes 12 are defined by the body 9, the ribs 10 and the support tube 1. The porous support tube 1, the body 9 and the ribs 10 can be preferably formed by extrusion molding in one piece in their longitudinal direction from a viewpoint of manufacturing efficiency.

In this case, it is preferable to make the porous support tube 1, the flat-plate shaped ribs 10 and the solid-cylindrical body 9 from the same material, and the material is preferably conductive as described later. Such a porous conductive material may be Sr-doped $LaCrO_3$, Sr-doped $LaMnO_3$ and the like.

An air electrode 5 may be made of doped or undoped $LaMnO_3$, $CaMnO_3$, $LaNiO_3$, $LaCoO_3$, $LaCrO_3$ and the like, among which $LaMnO_3$ doped with Sr is preferable.

On the outer surface of the air electrode 5, an airtight solid electrolyte 4, generally composed of zirconia stabilized with yttria and having a thickness of about 1 micron ~ 100 micron, is formed. When forming the solid electrolyte 4, a preselected region extending in the longitudinal direction is covered with a mask to prevent the solid electrolyte 4 from attaching to the air electrode 5 in the region. After forming the solid electrolyte 4, an interconnector 2 is formed on the air electrode 5 in the above masked region. The interconnector 2 must be conductive under an oxidizing gas atmosphere and under a fuel gas atmosphere. Preferably, the interconnector 2 has a thickness of 5~100 micron. A fuel electrode 3, which acts as an anode, is formed on the surface of the solid electrolyte 4 in a power generating region other than the preselected region in which the interconnector 2 is formed. The fuel electrode 3 generally has a thickness of 30~100 micron and is generally made of nickel-zirconia cermet or cobalt-zirconia cermet.

A connecting terminal 6 is attached to the surface of the interconnector 2. The connecting terminal 6 may be made of nickel-zirconia cermet, cobalt-zirconia cermet, nickel or the like.

When operating the cell, for example, fuel gas flows around the surface of the fuel electrode 3 as shown by arrows D, while an oxidizing gas flows in three oxidizing gas flow routes 12 defined by the solid-cylindrical body 9 and the flat-plate ribs 10 as shown by arrows E. Oxygen molecules contained in the oxidizing gas permeate the porous support tube 1 to produce oxygen ions at the interface between the air electrode 5 and the solid electrolyte 4. These oxygen ions move through the solid electrolyte 4 into the fuel electrode 3, at where the oxygen ions react with fuel and emit electrons to the fuel electrode 3.

Remarkable effects described below are obtained by applying the hollow-cylindrical SOFC according to the present example.

(1) Since the solid-cylindrical body 9 is placed in the central portion of the internal space 7, the oxidizing gas-flow in the central portion of the internal space 7, which does not contribute the power generation, can be prevented. Therefore, it is possible to utilize the oxidizing gas efficiently without the loss of the oxidizing gas, whereby the power generating efficiency is improved.

(2) Since the oxidizing gas-flow routes 12, which are narrower than the internal space 7, are formed between the inner surface of the porous support 1 and the solid-cylindrical body 9, the sectional area of each route 12 is considerably smaller than that of the internal space 7 which is a conventional gas flow route. As a result, an average flow rate of the oxidizing gas becomes larger to convert the oxidizing gas-flow, which is provided as laminar flow as shown by an arrow A, into turbulent flow as shown by arrows E. In the turbulent flow, the momentum is are exchanged in a far larger scale, and the flow becomes extremely irregular in a time scale and a space scale as compared with the laminar flow. Therefore, depleted-flow in which an oxygen concentration has already been decreased is mixed with fresh-flow having relatively high oxygen concentration in the oxidizing gas flow as a whole to prevent the depleted oxidizing gas, in which the oxygen concentration has already been decreased, from continuing to flow in layers around the inner surface of the porous support tube 1. As a result, it is possible to prevent the lowering of the power generating efficiency due to the inactivation of the reactions at the electrode films, and to reduce the thermal stress and strain due to the thermal gradient.

Moreover, a ratio of an outer diameter of the solid-cylindrical portion 9 to a diameter of the internal space 7 is preferably not less than 0.3 to generate turbulent flow effectively as described above and to prevent a loss of the oxidizing gas.

(3) The cylindrical SOFC element has an opening at each end thereof so as to flow the oxidizing gas from one opening to the other opening, so that it is possible to omit the sealing process of one opening and to reduce the manufacturing cost.

(4) When the solid-cylindrical body 9, the flat-plate shaped ribs 10 and the porous support tube 1 are extruded in one piece, the porous support tubes 1 with a homogenous structure can be manufactured efficiently and very disadvantageously.

(5) Since the flat-plate shaped ribs 10 extend radially from the solid-cylindrical body 9 and the porous support tube 1 is supported by the ribs 10 against a pressure in the radial directions, the porous support tube 1 has an improved radial crushing strength as compared with the conventional porous support from the standpoint of structural mechanics. The number of the flat-plate shaped ribs can be varied.

(6) Until now, even if the porous support tube was formed of conductive material, electric current flows circumferentially in the hollow-cylindrical porous support.

On the contrary, when the flat-plate shaped ribs 10, the porous support tube 1 and the solid-cylindrical body 9 are formed of the porous conductive material, electric current flows through the flat-plate shaped ribs 10 and the solid-cylindrical body 9 as shown by arrows J in addition to the circumferential current path described above. Therefore, when a plurality of the hollow-cylindrical SOFC elements are electrically connected in series, the loss of current can be reduced and the overall power generating efficiency can be further improved.

In the example of FIG. 1, the air electrode 5 may be provided on the outer surface of the solid electrolyte 4 and the fuel electrode 3 may be provided on the inner surface of the solid electrolyte 4. In this case, the fuel gas is supplied to the internal space of the hollow-cylindrical SOFC element and the oxidizing gas is supplied to the external space of the element. In this case, the similar effects as described in (1)~(6) can be obtained. Moreover, it is possible to prevent the flowing of fuel ingredients such as $H_2$, CO, etc., contained in the fuel gas through the internal space before contributing to power generation. Therefore, this SOFC is much more preferable.

FIGS. 3 to 6 are sectional views of hollow-cylindrical SOFC's wherein various converting means are adopted instead of the solid-cylindrical body 9.

In the example of FIG. 3, each opening of a hollow cylinder 19b is sealed with a sealing portion 19a at each end. A hollow-cylindrical body 19 comprised of the hollow cylinder 19b and two sealing portion 19a, is placed in the central portion of the internal space 7 instead of the solid-cylindrical body 9. The hollow cylinder 19b is supported by the flat-plate shaped ribs 10. Moreover, the hollow cylinder 19b, the flat-plate shaped ribs 10 and the porous support tube 1 can also be extruded in one piece as in the example of FIG. 1. In the example of FIG. 3, both openings of the hollow cylinder 19b are sealed with the sealing portions 19a, respectively. However, it is sufficient to seal at least one opening located on an upper stream side of the oxidizing gas flow.

In the present example, since the hollow body is adopted as the converting means for converting the gas-flow to turbulent flow instead of the solid body, it is possible to reduce the thermal stress because of its hollow structure and to improve its thermal-shock resistance. Therefore, such converting means is more applicable to SOFC's operating at high temperatures for long times.

Figure 4:
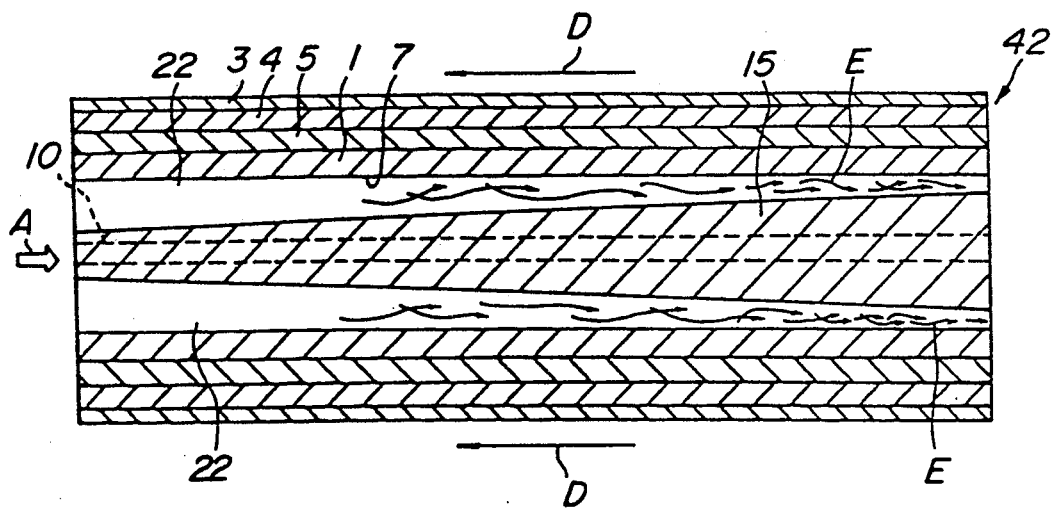

In the example of FIG. 4, a solid-cylindrical body 15, which is placed in the internal space 7, is tapered and supported by the flat-plate shaped ribs 10. The outer diameters of the tapered solid-cylindrical body 15 are enlarged continuously from an upper-stream portion to a downstream portion of the oxidizing gas-flow. As a result, the cross sectional areas of the oxidizing gas-flow routes 22 are relatively large in the upper-stream portion, and the sectional areas become smaller gradually as the oxidizing gas flows toward the downstream portion. Therefore, the oxidizing gas flows into the oxidizing gas-flow routes 22 as the arrow A and flows in the routes relatively slowly in layers at first. However, as the oxidizing gas approaches the downstream portion, the oxygen molecules are consumed and the oxidizing gas flows more rapidly to convert the oxidizing gas into the turbulent flow as shown by arrows E.

In the example of FIG. 5, a hollow-cylindrical body 25c is tapered and the outer diameter of the tapered hollow-cylindrical body 25c is enlarged gradually from the upper-stream portion to the downstream portion of the oxidizing gas-flow. One opening of the hollow-cylindrical body 25c located in the upper-stream portion is sealed with a sealing portion 25a, and the other opening located in the downstream portion is sealed with a sealing portion 25b having a diameter larger than that of the sealing portion 25a. The sealing portion 25b in the downstream portion can be omitted.

In the example of FIG. 6, a rod 16 is fixed in the internal space 7 in the longitudinal direction of the element 42, and a plurality of plates 17, for example, circular plates, are fixed to the rod 16 at predetermined intervals and extend in the radial directions of the element 42. Therefore, the oxidizing gas, which flows into the internal space 7 as the arrow A, crashes into the plates 17 to be stirred vigorously and passes through gaps between the plates 17 and the porous support tube 1. The oxidizing gas-flow is stirred as described above repeatedly before reaching the downstream portion. As described above, the oxidizing gas-flow is converted into turbulent flow as shown by the arrows E. As a result, it is possible to prevent the oxidizing gas from flowing in layers through the central portion of the internal space 7 and to prevent the depleted-oxidizing gas, in which the oxygen concentration has already been decreased, from flowing continuously around the inner surface of the porous support.

Figure 7:
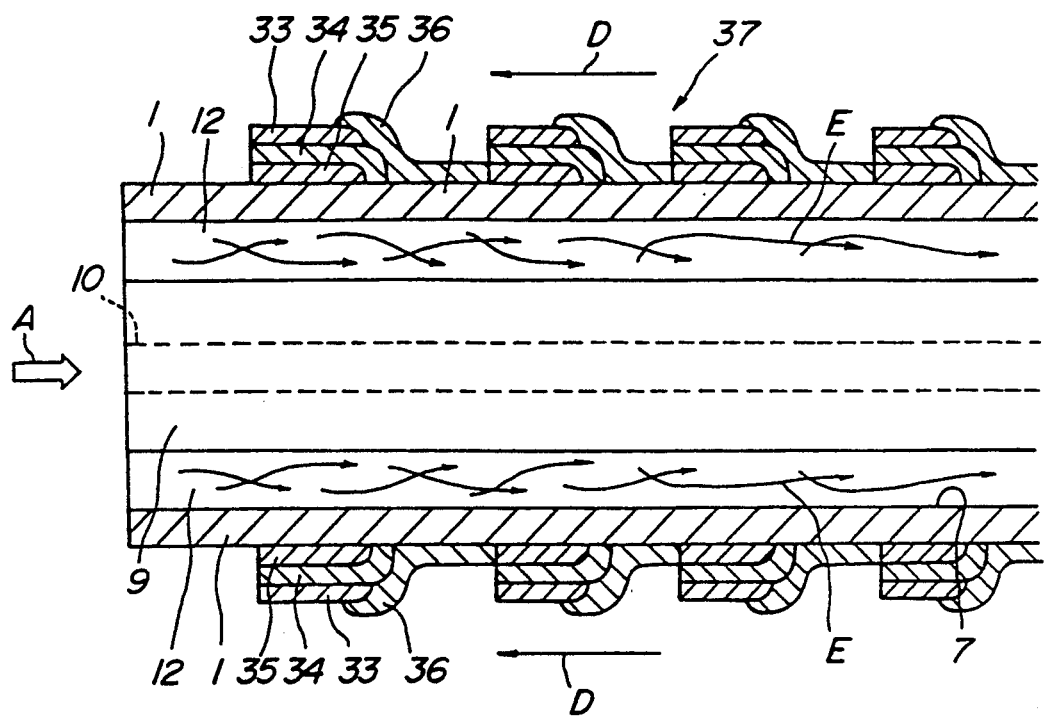
FIG. 7 is a partial sectional view of a so-called multicell type SOFC to which the invention is applied.

FIG. 7 is a partial sectional view of a so-called multi-cell type SOFC to which the present invention is applied.

A plurality of air electrodes 35 are provided on the surface of a porous support tube at specific intervals in the longitudinal direction thereof, and a solid electrolyte 34 and a fuel electrode 33 are successively formed on each of the air electrodes 35. Each of the fuel electrodes 33 is successively electrically connected to the adjacent air electrode 35 by an interconnector 36.

The other components are basically the same as those of the SOFC shown in FIG. 1. The solid-cylindrical body 9 is fixed in the central portion of the internal space 7 of the above constructed SOFC element 37 in its longitudinal direction. Three oxidizing gas-flow routes 12 are formed by the body 9, the porous support tube 1 and three flat-plate shaped ribs 10.

Figure 8:
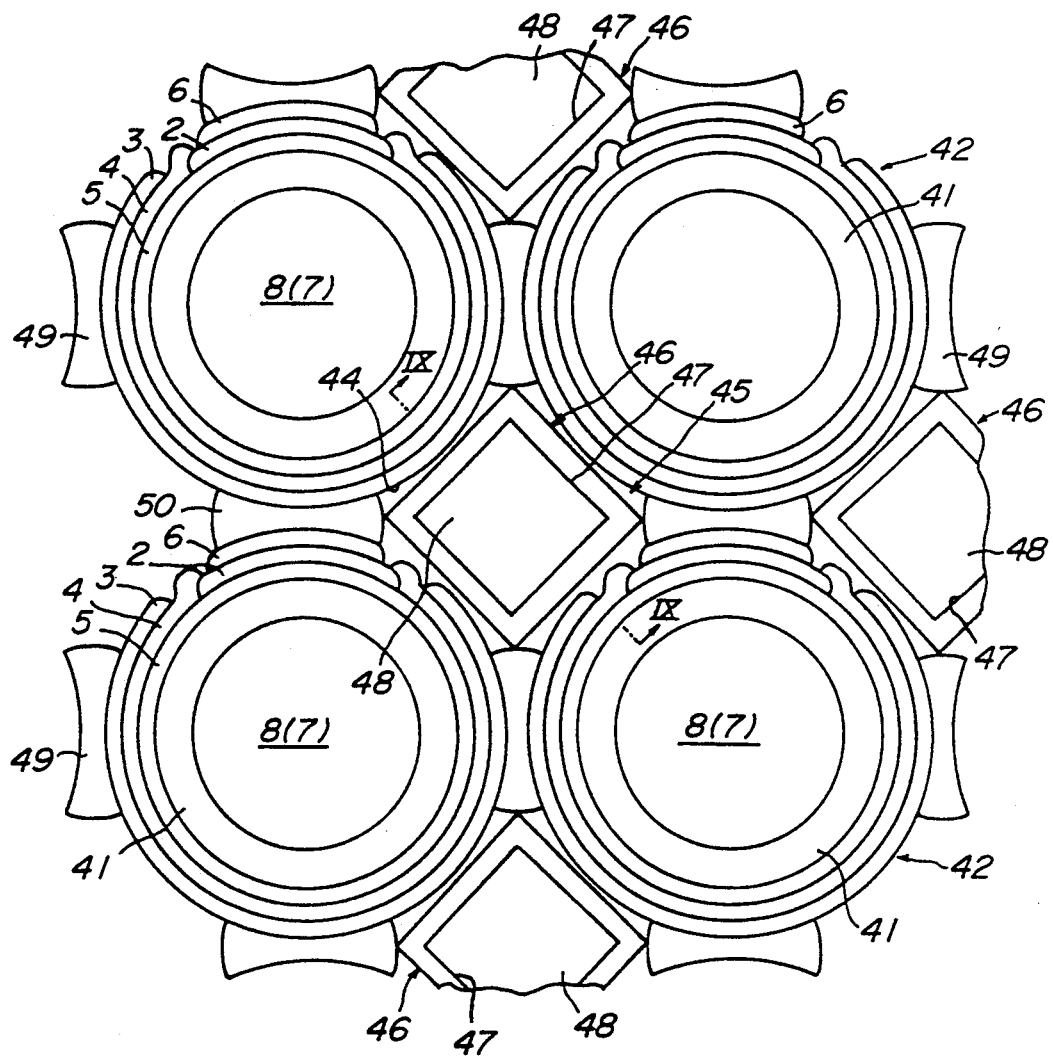
FIG. 8 is a partial front view of a hollow-cylindrical SOFC embodying the second preferred embodiment of the invention.

FIG. 8 is a partial front view of a cylindrical SOFC embodying the second preferred embodiment of the invention. FIG. 9 is a sectional view taken along a line IX—IX of FIG. 8.

In the SOFC, a converting means 46 is fixed in an external space 45, which is defined between four hollow-cylindrical SOFC elements 42, in the longitudinal direction of the element to obtain various remarkable effects.

The converting means 46 is composed of a tube-shaped body 47, which extends in the longitudinal direction and its outer profile in the radial directions is a rhombus, and a sealing portion 48 which seals the opening of the tube-shaped body 47 in the upper-stream portion. Two metal felts 49 and two metal felts 50 face the same external space 45. The tube-shaped body 47 has four edge lines extending in the longitudinal direction on its outer surface. Then, the tube-shaped body 47 contacts the metal felts 49 and 50 at the edge lines, respectively and is fixed in the external space 45 by four metal felts. Although only a part of the SOFC equipment is shown in FIG. 8, the converting means 46 is also fixed in each of the external spaces in the same manner as mentioned above. A narrow fuel gas-flow route 44 is formed between the outer surface of the tube-shaped body 47 and the fuel electrode films 3 in the external space 45.

The tube-shaped body 47 may preferably be formed of non-conductive ceramics. In particular, a felt-board composed of ceramic fibers is most preferable because of the cushioning effect and relatively high thermal-shock resistance.

The air electrode 5, the solid electrolyte 4, the fuel electrode 3, the interconnector 2, the connecting terminal 6 and the internal space 7 are basically the same as in the aforementioned first embodiment of the SOFC (refer to FIG. 1 and its explanation).

The metal felts 49 and 50 may preferably be made of nickel, etc.

When operating the cell, the oxidizing gas flows in the internal space 7 of each hollow-cylindrical SOFC element 42, while the fuel gas flows in the fuel gas-flow route 44 formed in the external space 45 as shown by arrows H in FIG. 9. Oxygen molecules contained in the oxidizing gas permeate the porous support tube 41 to produce oxygen ions at the interfaces between the air electrode 5 and the solid electrolyte 4. These oxygen ions move through the solid electrolyte 4 into the fuel electrode 3, where the oxygen ions react with fuel and emit electrons to the fuel electrode 3.

Remarkable effects descried below are obtained by applying the hollow-cylindrical SOFC according to the present example.

(1) Since the tube-shaped body 47 with the sealing portion 48 is placed in the central portion of the external space 45, the fuel gas-flow in the central portion of the external space 45, which does not contribute to power generation, can be prevented. Therefore, it is possible to utilize the fuel gas efficiently without the loss of fuel, whereby the power generating efficiency is improved.

(2) Since the fuel gas-flow route 44, which is narrower than the external space 45, is formed between the outer surface of the fuel electrode 3 and the tube-shaped body 47, a sectional area of the route 44 is considerably smaller than that of the external space 45 which is a conventional gas-flow route. As a result, an average flow rate of the fuel gas becomes larger to convert the fuel gas-flow, which is provided as laminar flow as shown by an arrow G, into turbulent flow as shown by arrows H. In the turbulent flow, the momentum is exchanged in a far larger scale, and the flow becomes extremely irregular in a time scale and a space scale as compared with the laminar flow. Therefore, depleted-flow in which a fuel concentration has already been decreased is mixed with fresh-flow having relatively high fuel concentration in the fuel gas-flow as a whole to prevent the depleted fuel gas, in which the fuel concentration has already been decreased, from continuing to flow in layers around the outer surface of the fuel electrode 3. As a result, it is possible to prevent lowering of power generating efficiency and to reduce the thermal stress and strain.

(3) Since the tube-shaped body 47 having a hollow structure is adopted as the converting means, the thermal-shock resistance is higher as compared with that of the solid body. Therefore, such converting means is more applicable to SOFCs operating at high temperatures for long times.

(4) Until now, there were some cases that the metal felts 49 moved in the vertical direction or the metal felts 50 moved in the horizontal direction in FIG. 8 after assembling a stack.

On the contrary, in the present example, the tube-shaped body 47 as the converting means 46 is fixed in each external space 45 and contacts the metal felts 49 and 50 at the edge lines of the outer surface to apply some pressure to the felts. In the other words, each metal felt 50 is pressed in the horizontal direction and each metal felt 49 is pressed in the vertical direction by the tube-shaped body 47. Therefore, the metal felts 49 and 50 are positioned at predetermined places without moving.

In the example of FIG. 8, the air electrode 5 may be provided on the outer surface of the solid electrolyte 4 and the fuel electrode 3 may be provided on the inner surface of the solid electrolyte 4. In this case, the fuel gas is supplied to the internal space 7 of the hollow-cylindrical SOFC element 42 and the oxidizing gas is supplied to the external space 45 of the element. In this example, similar effects as described in (1)~(4) can be obtained. Further, in this case, the metal felts 49 and 50 may preferably be formed of conductive oxide fiber, for example, such as doped $In_2O_3$, etc.

In the above example, as shown in FIG. 9, one opening of the tube-shaped body 47 located in the upper-stream portion is sealed with the sealing portion 48 and the other opening is not sealed. However, the other opening may be sealed with the similar sealing portion as described above.

FIGS. 10 to 12 are sectional views of hollow-cylindrical SOFC, wherein various converting means are adopted instead of the hollow tube-shaped body.

In the example of FIG. 10, a solid pillar-shaped body 51 is placed in the central portion of the external space 45 instead of the hollow tube-shaped body. The pillar-shaped body 51 has the same outer profile in the radial directions as in the hollow tube-shaped body 47 of FIG. 8 and is supported by the metal felts 49 and 50 in the same manner as described above.

In the example of FIG. 11, a hollow tube-shaped body 52 is tapered and the outer diameters of the tapered tube-shaped body 52 are enlarged gradually and continuously from the upper-stream portion to the downstream portion of the fuel gas-flow. One opening of the hollow-cylindrical body 52 located in the upper-stream portion is sealed with a sealing portion 53. The other opening of the body 52 located in the downstream portion may be sealed with a sealing portion having a diameter larger than that of the sealing portion 53.

In the present example, the sectional area of the fuel gas-flow route 44 is relatively large in the upper-stream portion, and the sectional area becomes smaller gradually as the fuel gas flows toward the downstream portion. Therefore, the fuel gas flows into the fuel gas-flow route 44 as the arrow G and flows in the route relatively slowly in layers at first. However, as the fuel flow gas approaches to the downstream portion, the fuel is consumed and the fuel gas flows more rapidly to convert the fuel gas into turbulent flow as shown by arrows H.

In the example of FIG. 12, a rod 54 is fixed in the external space 45 in the longitudinal direction of the SOFC element 42, and a plurality of plates 55, for example, circular or rhomboid plates, are fixed to the rod 54 at predetermined intervals and extend in the radial directions of the element 42. Therefore, the fuel gas, which flows into the external space 45 as the arrow G, crashes into the plates 55 to be stirred vigorously and passes through gaps between the plates 55 and the outer surface of the fuel electrode 3. The fuel gas-flow is stirred as described above repeatedly before reaching the downstream portion. As described above, the fuel gas-flow is converted into turbulent flow as shown by the arrows H. As a result, it is possible to prevent the fuel gas from flowing in layers through the central portion of the external space 45 and to prevent the depleted fuel gas, in which the fuel concentration has already been decreased, from flowing continuously around the outer surface of the fuel electrode 3.

As the converting means, for example, hollow tube-shaped bodies or solid pillar-shaped bodies, in which many spines are provided on the outer surface or in which a channel or a convex is provided spirally on the outer surface like a screw, may be adopted other than ones shown in FIGS. 1~12.

In the above examples, the air electrode 5, etc. is formed on the surface of the porous support tube 1 or 41. However, a hollow-cylindrical air electrode itself or a hollow-cylindrical fuel electrode itself can be used as a rigid support without the above porous support tube 1 or 41. In this case, the SOFC element can be structurally independent without using the above porous support tube which does not constitute the electrodes.

Instead of using the hollow-cylindrical SOFC elements, the other tube-shaped elements, for example, tube-shaped elements in which their inner and outer profiles are tetragonal, hexagonal or the like taken in the radial directions, may be used.

What is claimed is:

1. A solid oxide fuel cell comprising:
   a plurality of elongate, tube-shaped solid oxide fuel cell elements arranged in parallel and defining external spaces between adjacent fuel cell elements;
   a gas flow passage defined in each fuel cell element for receiving therein one of an oxidizing gas or a fuel gas, wherein the other one of said oxidizing gas or fuel gas flows in said external spaces between said fuel cell elements;
   means for electrically connecting electrodes of adjacent fuel cell elements;
   means for converting gas flow in said external spaces into turbulent flow at surfaces of fuel cell element electrodes exposed to said external spaces, said converting means comprising elongate bodies arranged in said external spaces and extending in a longitudinal direction of said fuel cell elements.

2. The solid oxide fuel cell of claim 1, wherein each said elongate body is laced in a central portion of a respective external space.

3. The solid oxide fuel cell of claim 2, wherein said elongate body is a solid elongate body or a tubular elongate body having at least one end opening thereof sealed.

4. The solid oxide fuel cell of claim 3, wherein metal felt is interposed between adjacent fuel cell elements, such that a part of said metal felt faces said respective external space and said elongate body contacts said metal felt.

5. The solid oxide fuel cell of claim 4, wherein an outer profile of said elongate body as viewed transversely to said longitudinal direction is tetragonal and has four edge lines extending said longitudinal direction, and four of said metal felts face said respective external space, in which each said elongate body is placed, and contact said four edge lines of said body, respectively.

6. The solid oxide fuel cell of claim 3, wherein said elongate body comprises electrically non-conductive ceramic material.

7. The solid oxide fuel cell of claim 4, wherein said elongate body comprises electrically non-conductive ceramic material.

8. The solid oxide fuel cell of claim 5, wherein said elongate body comprises electrically non-conductive ceramic material.

9. The solid oxide fuel cell of claim 3, wherein said elongate body comprises felt-board composed of ceramic fibers.

10. The solid oxide fuel cell of claim 4, wherein said elongate body comprises felt-board composed of ceramic fibers.

11. The solid oxide fuel cell of claim 5, wherein said elongate body comprises felt-board composed of ceramic fibers.

12. The solid oxide fuel cell of claim 3, wherein said elongate body is tapered, and an outer dimension of the tapered body increases continuously in the downstream direction of gas flow in said external spaces.

13. The solid oxide fuel cell of claim 1, further comprising means for converting gas flow in said gas flow passage defined in each fuel cell element into turbulent flow at surfaces of fuel cell electrodes exposed to each said gas flow passage, said converting means comprising elongate bodies arranged in each said gas flow passage and extending in a longitudinal direction of said fuel cell elements.

* * * * *